Nov. 27, 1951  D. E. SUNSTEIN  2,576,424
AUTOMATIC SPEED CONTROL FOR RAIL-GUIDED VEHICLES
Original Filed May 9, 1945
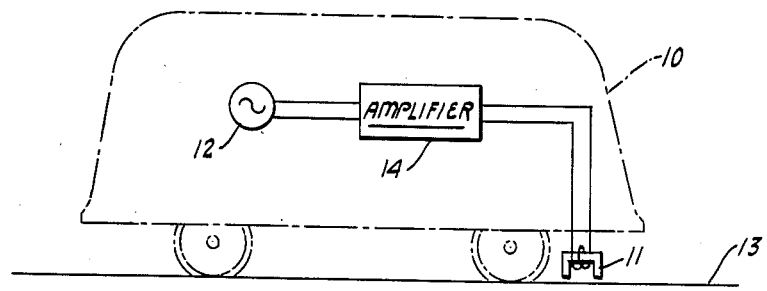
FIG. 1.
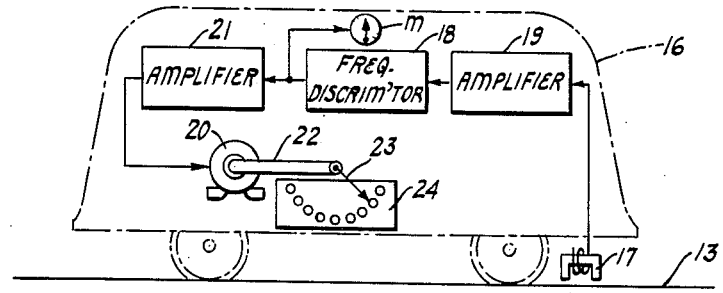
FIG. 2.
FIG. 3.
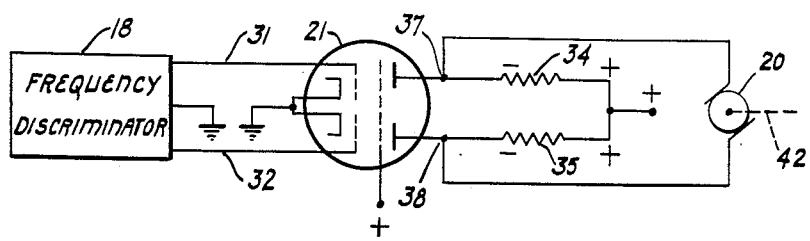
FIG. 4.
INVENTOR.
DAVID E. SUNSTEIN
BY
Brown, Denk & Lynnestvedt
AGENTS Patented Nov. 27, 1951

2,576,424

UNITED STATES PATENT OFFICE 2,576,424

AUTOMATIC SPEED CONTROL FOR RAIL-GUIDED VEHICLES

David E. Sunstein, Cynwyd, Pa., assignor to Philco Corporation, Philadelphia, Pa., a corporation of Pennsylvania Original application May 9, 1945, Serial No. 592,780. Divided and this application October 9, 1948, Serial No. 53,663

4 Claims. (Cl. 246—63)

The invention herein described and claimed relates to a novel apparatus for detecting and controlling the speed of moving vehicles. The apparatus is particularly adapted to the speed control of vehicles which move upon, or relative to, a track or rail. The present invention is a division of my copending application Serial No. 592,780, filed May 9, 1945, now abandoned.

It is a principal object of the instant invention to provide an improved apparatus for detecting and/or controlling the speed of rail-guided vehicles and the like.

It is a more specific object of the present invention to provide an improved speed-control system for railroad trains, and the like, which system is characterized in the provision and utilization of a control signal magnetically recorded in the rail or track over which the controlled train passes.

In accordance with a feature of the invention, a control signal is magnetically recorded in one of the rails of a railroad track, the wavelength of the signal, in the rail, being representative of a predetermined, desired speed known to be suitable for that particular section of track. Trains or other vehicles traversing the track may utilize the signal recorded in the track as a means for indicating and/or controlling the speed of the train. To this end, the train, or other vehicle, may be provided with a suitable pickup device by means of which a derived signal may be developed in response to the recorded control signal. The instantaneous frequency of this derived signal will vary, of course, according to the wavelength of the signal recorded in the track and to the speed of motion of the vehicle over or along the track. The signal thus obtained is utilized to effect a desired function, such as indication or control of the speed of the vehicle.

These and other objects and features of the invention, and the manner in which they are obtained, will appear from the following detailed description and the accompanying drawing, in which Fig. 1 is a diagrammatic illustration of a track vehicle equipped with recording apparatus in accordance with the invention;

Fig. 2 is a graphic illustration of a speed-control signal wave which constitutes the recorded intelligence hereinbefore mentioned;

Fig. 3 is a diagrammatic illustration of an apparatus which may be employed to detect or control the speed of a track-guided vehicle; and Fig. 4 is a diagrammatic illustration of a specific speed control arrangement which may be employed in the apparatus of Fig. 3.

The embodiment described with reference to Figs. 1 to 4 illustrates an application of the invention to the speed-control of a track-guided vehicle such as a locomotive. In this application of the invention, the speed-control signal may be recorded magnetically on one of the track rails, or alternatively upon a special magnetizable rail which parallels and is in proximity to the track rails. The vehicle whose speed is to be controlled is equipped with a pickup device placed adjacent to the magnetized rail so as to generate an electrical signal in response to the wave magnetically recorded therein. It will be evident that the wavelength of the recorded signal in the rail will vary only with the speed of the recording apparatus where the signal supplied the recorder is of fixed frequency. In accordance with this invention the speed of the controlled vehicle may be controlled so as to be substantially identical to the vehicle speed employed during the recording process, or to any given multiple or fraction of this speed, as explained hereinafter.

In Fig. 1 there is illustrated an apparatus suitable for recording a control signal upon one of the rails of the track. A vehicle or car 10 carrying the recording device 11 and a fixed-frequency signal source 12 is operated at a desired speed with respect to the stationary rail 13. The output of source 12 is applied to the recording device 11 and if desired a conventional amplifier 14 may be employed between the signal source 12 and the recorder 11. The recorder 11 may comprise a magnetic core of soft iron and an associated coil arranged to produce a magnetic field which varies in accordance with the current supplied to it. Such magnetic recording devices and the manner of recording signals on a magnetic material are well known in the art, and hence it is unnecessary to describe these in detail. The signal supplied by source 12 may have any desired wave form as long as its frequency is constant. It is, however, preferable to employ a sine wave signal. Any frequency suitable for magnetic recording may be employed, for example an audio frequency.

Having in mind that the frequency of the signal supplied to recorder 11 is constant, it will be seen that the wavelength of the control signal recorded on rail 13 will depend upon the speed of the recording vehicle 10. Now, if the speed of the vehicle 10 varies in correspondence with the speeds at which it is desired to operate other vehicles at various locations in the track system the wavelength of the recorded signal wave will change accordingly. In Fig. 2 there is graphically illustrated a portion of the recorded signal wave having three different wavelengths corresponding to different speeds of the car 10. Three different portions of the signal wave are represented at $a$, $b$ and $c$. The intermediate portion $b$ is intended to represent the wavelength of the recorded signal wave corresponding to a certain desired speed at that portion of the track. In portion a the wavelength is less than that of portion b, indicating that the car 10 was moving at a lower speed over that part of the track. In portion c the wavelength is greater than that of portion b, indicating that the car 10 was moving at a greater speed in this part of the track. Thus Fig. 2 illustrates the manner in which the wavelength of the magnetically recorded signal is caused to vary in response to speed variations of vehicle 10.

The control signal thus recorded on the rail may be utilized to detect or control the speed of any other vehicle that moves in relation to rail 13. To this end, the vehicle whose speed is to be detected or controlled is equipped with suitable apparatus including a pickup device which responds to the recorded control signal. In Fig. 3 there is diagrammatically illustrated a vehicle 16, such as an electric locomotive, equipped with apparatus which may be employed to control its speed. A pickup device 17, arranged to generate an electrical signal in response to the recorded signal wave, is mounted on vehicle 16 so that it moves in proximity to rail 13. Pickup device 17 may be of the same general character as recording device 11 in Fig. 1. The electrical signal generated by the pickup 17 will vary in frequency according to the wavelength of the recorded signal and the speed of travel of the vehicle 16 upon which the pickup is mounted. The output of device 17 is supplied to a balanced frequency discriminator 18, preferably through an amplifier 19. The frequency discriminator is of known form, being similar to that used in radio receivers for frequency modulation detection or for automatic frequency control, except that it is adapted to operate at lower frequencies than those ordinarily employed in radio receivers. As is well known, a balanced frequency discriminator is a device which has zero output at a predetermined input frequency, and which produces an output voltage in response to input frequency variations on either side of the predetermined center frequency. With the frequency discriminator adjusted for zero output at the frequency of source 12 in Fig. 1, the vehicle 16 in Fig. 3 must travel at the recording speed to maintain zero output from the discriminator. Thus with vehicle 16 traveling at a speed corresponding to the recording speed for portion b of Fig. 2 the signal frequency applied to the discriminator 18 would be decreased when the vehicle entered a section of the track having the longer wavelength recording of portion c, whereas the signal frequency applied to the discriminator would be increased if the vehicle entered instead a section of the roadway having the shorter wavelength recording of portion a.

The output voltage of a discriminator has, of course, a polarity dependent upon the direction of the frequency deviation from the center frequency, and a magnitude dependent upon the extent of the frequency deviation. The output from the discriminator may be utilized either to effect indication of the speed of the moving vehicle, or to effect control of the vehicle's speed. For example, in order to indicate the deviation of speed of the vehicle from a given predetermined value, a galvanometer M with a zero-center scale may be connected to the output of discriminator 18. The galvanometer will then register plus-or-minus speed deviations, and may be used as an indicator by means of which an engineer or attendant may inform himself of the extent and character of said variations.

To accomplish automatic control of the speed of vehicle 16 the output of discriminator 18 is applied, preferably through an amplifier 21, to a suitable reversible motor 20 which in turn, through the shaft 22, affects the adjustment of the rotatable arm 23 of the main driving motor controller 24. In this case it is assumed that the vehicle 16 is electrically driven and that controller 24 is arranged to control the power delivered by the driving motor (not shown). However the shaft 22 may alternatively be caused to operate a throttle.

A circuit for effecting control of the reversible motor 20 in Fig. 3 is illustrated in detail in Fig. 4. Frequency discriminator 18 is arranged to produce two voltages that are normally balanced with respect to ground. Such a discriminator is shown in U. S. Patent No. 2,240,428 issued April 29, 1941 to Charles Travis. The output leads 31 and 32 may be connected to the control grids of a dual vacuum tube amplifier 21 which is preferably a dual pentode. The cathodes of this tube are connected to a common ground so that the voltages from the discriminator are applied to the input elements of the respective tube sections in push-pull relation. The plates or anodes of the dual tube are connected through load resistors 34 and 35 to a suitable source of plate supply voltage. A small D. C. motor 20 with a separately excited field or permanent magnet field (not shown), has its armature terminals connected to points 37 and 38 respectively at the anode end of each load resistor. It will be noted that the energizing circuit of the motor 20 includes the resistors 34 and 35 in series, so that the motor has supplied thereto a voltage which is the resultant of the voltages produced across said resistors in response to current flow therethrough. As indicated the voltages produced across the two resistors by the plate current flow therethrough, are of opposite polarity so far as the motor 20 is concerned. Consequently the voltage applied to the motor 20 is the difference between the voltages across said resistors, and the polarity of the resultant voltage at any instant is determined by the greater of the two voltages.

When the frequency of the signal applied to the discriminator 18 is at the center value, the plate currents of the respective tube sections have a certain value established by the control voltages applied to the control grids, and the value of the resistors 34 and 35 are such that the voltages produced thereacross are equal. Consequently there is no resultant voltage applied to the motor 20 and the latter is not energized.

When the frequency of the signal applied to the frequency discriminator increases or decreases with respect to the center frequency, the output voltages of the discriminator vary correspondingly in differential fashion. Consequently the plate currents through the resistors 34 and 35 vary correspondingly, thus producing a resultant voltage whose polarity is dependent upon whether the input frequency increased or decreased, and whose amplitude is determined by the amount of frequency variation from the center frequency. The resultant voltage is applied to the motor 20 and causes it to run in one direction or the other at a speed which is dependent upon the amplitude of such voltage.

It will be apparent from the previous description that the motor 20, Fig. 3, will turn in one direction or the other according to frequency deviation of the signal developed by the pickup 17. The resulting change in speed of the vehicle acts to return the frequency of the developed signal to the center-frequency of the discriminator 18 whereupon the output of the discriminator returns to zero and the motor 20 is deenergized. In general the operation of the overall system is such as to cause the vehicle whose speed is determined by the position of controller arm 23 to travel at a speed proportional to the wavelength of the signal recorded in the rail 13, and substantially independent of vehicle loading, steepness of grade, or the like.

If desired, the center operating frequency of discriminator 18 may be made manually adjustable in order to enable the operator of the vehicle whose speed is automatically controlled to adjust the speed to any given multiple or fraction of the predetermined speed. Thus, for example, a passenger train travelling over a given roadway may employ a discriminator tuned to say 100 C. P. S., whereas a freight train travelling the same track may be provided with a discriminator tuned to 33⅓ C. P. S. so that the freight train will be controlled at always one-third the speed of the passenger train traversing the same section of roadway.

It is important to note, in connection with the system described, that longitudinal recording of the signal wave on the rail avoids interference from the magnetic fields due to signal currents which may be traversing the rail, since the magnetic fields due to such currents are in transverse relation to the rail.

The invention herein disclosed also contemplates the conveyance of a signal from a stationary recording medium to a moving vehicle, or the transfer of a signal from one vehicle to another via a recording on a stationary recording medium. Thus in Figs. 1 and 3, a signal is transferred from one vehicle to the other via a recording on the rail 13.

Although the instant invention has been described with particular reference to a specific, preferred embodiment, it will be apparent that the invention is not thus limited, but is capable of other forms of physical expression.

I claim:

1. In a railway system having a rail of magnetic material: a source of alternating signal voltage of fixed frequency, a magnetic recording means coupled to said source, means for moving said magnetic recording means along said rail at a predetermined speed or speeds to inscribe magnetically therein a record of said alternating signal voltage, the wavelength of the recorded signal in said rail being directly proportional to the speed at which said recording means is moved along said rail, a speed-controlled vehicle moving along said rail, magnetic pickup means carried by said speed-controlled vehicle, said pickup, in response to the magnetic record in said rail, developing a derived alternating voltage whose frequency is directly proportional to the speed of said vehicle and inversely proportional to the wavelength, in said rail, of said recorded signal, frequency responsive means coupled to said pickup means for developing a control voltage whose magnitude is a function of the frequency of said derived alternating voltage, and means responsive to said control voltage for controlling the speed of said vehicle.

2. In a railway system having a rail of magnetic material: a source of alternating signal voltage of fixed frequency, a magnetic recording means coupled to said source, means for moving said magnetic recording means along said rail at a predetermined speed or speeds to inscribe magnetically therein a record of said alternating signal voltage, the wavelength of the recorded signal in said rail being directly proportional to the speed at which said recording means is moved along said rail, a vehicle moving along said rail, magnetic pickup means carried by said vehicle, said pickup, in response to the magnetic record in said rail, developing a derived alternating voltage whose frequency is directly proportional to the speed of said vehicle and inversely proportional to the wavelength, in said rail, of said recorded signal, frequency responsive means coupled to said pickup means for developing a voltage whose magnitude is a function of the frequency of said derived alternating voltage, and means for utilizing said last-mentioned voltage to indicate the speed of said vehicle relative to that of said predetermined speed or speeds at which said recording means was moved.

3. In a railway system: a rail of magnetic material on which a vehicle is intended to travel, said rail having a continuous signal wave magnetically recorded therein whose wavelength in the rail is proportional to a standard, though not ordinarily uniform, rate of travel for said vehicle; signal pickup means carried by said vehicle responsive to said rail-recorded signal wave for deriving a signal whose frequency is a function of the instantaneous rate of travel of said vehicle relative to the standard rate of travel; frequency-responsive means coupled to said pickup means for developing a voltage whose value is a function of the frequency of said derived signal; and means responsive to said developed voltage for controlling the rate of travel of said vehicle relative to said standard rate of travel.

4. In a railway system: a rail of magnetic material on which a vehicle is intended to travel, said rail having a continuous signal wave magnetically recorded therein whose wavelength in the rail is proportional to a standard, although not ordinarily uniform, rate of travel for said vehicle; signal pickup means carried by said vehicle and responsive to said rail-recorded signal wave for deriving a signal whose frequency is a function of the instantaneous rate of travel of said vehicle relative to said standard rate of travel; frequency-responsive means coupled to said pickup means for developing a voltage whose value is a function of the frequency of said derived signal; and means for utilizing said developed voltage to indicate the speed of said vehicle relative to said standard rate of travel.

DAVID E. SUNSTEIN.

REFERENCES CITED

The following references are of record in the file of this patent:

UNITED STATES PATENTS

| Number | Name | Date |
| --- | --- | --- |
| 1,490,253 | Blosky | Apr. 15, 1924 |
| 1,747,041 | Alexanderson | Feb. 11, 1930 |
| 1,826,492 | Babson | Oct. 6, 1931 |
| 1,877,626 | Loughridge | Sept. 13, 1932 |
| 2,113,226 | Young | Apr. 5, 1938 |
| 2,334,510 | Roberts | Nov. 16, 1943 |
| 2,493,755 | Ferrill | Jan. 10, 1950 |